(12) United States Patent
Hebrard et al.

(10) Patent No.: US 12,743,763 B2
(45) Date of Patent: Sep. 22, 2026

(54) SYSTEM FOR TRAINING A DEEP-LEARNING ALGORITHM AND ASSOCIATED METHOD

(71) Applicants: AKTIEBOLAGET SKF, Gothenburg (SE); SKF Aerospace France S.A.S, Montigny-le-Bretonneux (FR)

(72) Inventors: Yoann Hebrard, Sarras (FR); Herve Carrerot, Vicq (FR)

(73) Assignees: AKTIEBOLAGET SKF, Gothenburg (SE); SKF Aerospace France S.A.S, Montigny-le-Bretonneux (FR)

( * ) Notice: Subject to any disclaimer, the term of this patent is extended or adjusted under 35 U.S.C. 154(b) by 294 days.

(21) Appl. No.: 18/706,495

(22) PCT Filed: Oct. 26, 2022

(86) PCT No.: PCT/EP2022/079878
§ 371 (c)(1),
(2) Date: May 1, 2024

(87) PCT Pub. No.: WO2023/078747
PCT Pub. Date: May 11, 2023

(65) Prior Publication Data
US 2025/0005734 A1 Jan. 2, 2025

(30) Foreign Application Priority Data
Nov. 8, 2021 (FR) ...................................... 2111796

(51) Int. Cl.
*G06T 7/00* (2017.01)

(52) U.S. Cl.
CPC .. *G06T 7/0004* (2013.01); *G06T 2207/20081* (2013.01)

(58) Field of Classification Search
None
See application file for complete search history.

(56) References Cited

U.S. PATENT DOCUMENTS

2021/0123833 A1* 4/2021 Tobon-Mejia ......... G01H 1/003

OTHER PUBLICATIONS

Convolutional neural network based bearing fault diagnosis of rotating machine using thermal images, By Choudhary et al., Measurement, vol. 176, May 2021, 109196 (Year: 2021).*

(Continued)

*Primary Examiner* — Vikkram Bali
(74) *Attorney, Agent, or Firm* — J-TEK LAW PLLC; Scott T. Wakeman; Mark A. Ussai

(57) ABSTRACT

A system and method for training a deep-learning algorithm to detect a defect in a ceramic rolling element incudes capturing a first data set of digital radiographic images of rolling elements, filtering the images of the first data set to improve contrast, classifying each image using a statistical learning algorithm into a first class of suspect rolling elements or into a first class of non-suspect rolling elements, using the first data set to train a deep-learning algorithm to classify each image of the first data set into a second class of suspect rolling elements or into a second class of non-suspect rolling elements, and comparing the classifications performed by the deep-learning algorithm to the classifications performed by the statistical learning algorithm to determine an accuracy of the deep-learning algorithm.

9 Claims, 5 Drawing Sheets

(56) References Cited

OTHER PUBLICATIONS

Fault diagnosis of rolling element bearings via discriminative subspace learning: Visualization and classification, By Zhaoa et al., Expert Systems with Applications, vol. 41, Issue 7, Jun. 1, 2014, pp. 3391-3401 (Year: 2014).*

Janssens, Olivier et al: "Convolutional Neural Network Based Fault Detection for Rotating Machinery", Journal of Sound and Vibration, May 24, 2016, pp. 331-345, vol. 377, Published by Elsevier, Amsterdam, NL XP029564152, ISSN: 0022-460X.

Preliminary Search Report from the French Patent Office dated Jun. 20, 2023 in related French application No. FR2111796, including Search Report and Written Opinion.

Written Opinion and International Search Report of the International Searching Authority in PCT/EP2022/079878 dated May 11, 2023.

* cited by examiner

SYSTEM FOR TRAINING A DEEP-LEARNING ALGORITHM AND ASSOCIATED METHOD

CROSS-REFERENCE

This application is the U.S. National Stage of International Application No. PCT/EP2022/079878 filed on Oct. 26, 2022, which claims priority to French patent application no. FR 2111796 filed on Nov. 8, 2021.

TECHNICAL FIELD OF THE INVENTION

The present invention relates to ceramic rolling elements, and more particularly relates to the detection of manufacturing defects in such rolling elements.

PRIOR ART

In order to guide a mechanical assembly in rotation, it is generally proposed to use rolling bearings equipped with rolling elements made of ceramic or of steel. The rolling elements may for example be balls or even cylindrical, conical or spherical rollers.

These rolling elements of rolling bearings allow a circular movement of a shaft with respect to a fixed element to be ensured while limiting frictional force.

They are applicable to reversible electric motors or combustion engines, both in the automotive and aeronautical fields.

However, as ceramic rolling elements are produced by sintering, they may contain inclusions of foreign material, non-uniform agglomerations of material, or porosities.

These defects are liable to make the rolling elements fail and therefore to damage the product comprising the rolling bearing equipped with such rolling elements.

For example, when the rolling bearing equipped with failed rolling elements is located on a rotating shaft, they may cause spalling and/or overheating and the shaft will rotate with increasing difficulty.

Moreover, the rolling elements are liable to completely disunite from the other components of the bearing and thus cause the rotating shaft to disassociate from its surrounding mechanical system: this may prove to be critical in aeronautics.

To prevent failure of a rolling element, it is advantageous to detect these defects right after its manufacture.

It is known to use x-rays to obtain radiographic images of rolling elements.

These images, after processing, are analysed by a human operator with a view to recognition of defects in the rolling element.

However, the procedure of recognition of defects in a rolling element by an operator is unsuitable for mass manufactured rolling elements.

As the ability of an operator to process images is limited, the defect-recognition procedure may slow the entirety of the rolling-element production line.

Furthermore, the operator may make mistakes in his interpretation of the images.

It is known to use a deep-learning algorithm, a neural network for example, to recognize predetermined features in an image.

However, in order for a deep-learning algorithm to perform well it must be trained.

In light of the above, the goal of the invention is to overcome the aforementioned constraints.

SUMMARY OF THE INVENTION

One subject of the invention is therefore a method for training a deep-learning algorithm for detecting a defect in a ceramic rolling element, comprising:

- capturing a set of digital radiographic images of rolling elements comprising defects and not comprising any defects,
- filtering a first time each image of the set of images in order to improve the contrast of each image,
- generating a data set on the basis of the set of filtered radiographic images,
- classifying, on the basis of the data set, each image of the set of radiographic images using a statistical learning algorithm into a class of suspect rolling elements or into a class of non-suspect rolling elements,
- training, on the basis of the set of radiographic images, a deep-learning algorithm so that the deep-learning algorithm classifies each image of the set of radiographic images into the class of suspect rolling elements or into the class of non-suspect rolling elements, and
- comparing the classification of the images of the image set performed by the statistical learning algorithm and the classification of the images of the image set performed by the deep-learning algorithm with a view to determining the accuracy of the classification of the deep-learning algorithm with respect to the classification performed by the statistical learning algorithm.

The analysis of the data of the classification performed by the learning algorithm makes it possible to interpret the variation in the weights of the deep-learning algorithm when it comprises a neural network.

When the precision of the deep-learning algorithm is sufficient, the procedure for recognition of defects in the rolling element may be automated so as to increase the production rate of a line for producing rolling elements while minimizing the risks of error in the interpretation of the image set.

Preferably, the generation of a training data set comprises:

- segmenting each image into various regions,
- filtering a second time each region of each image of the set of images to obtain a data vector, the data vector forming the training data set.

Advantageously, the classification of each image of the set of radiographic images by a statistical learning algorithm comprises:

- computing a value of an image-analysis indicator on the basis of the indicative data set of each image of the set of filtered images,
- comparing the analysis indicator to a threshold, and
- classifying each image depending on the result of the comparison.

Preferably, the image-analysis indicator comprises computing an average, and/or a standard deviation, and/or a median, and/or a greyscale gradient.

Advantageously, the training of a deep-learning algorithm comprises:

- segmenting each filtered image into various regions, and
- processing each region of each image using the deep-learning algorithm with a view to detecting at least one defect on the basis of a selection criterion,
- detecting a defect in light of a selection criterion specific to each region, and
- classifying each image.

Preferably, the selection criterion comprises the geometry of the rolling element in said region, and/or texture in said region and/or contrast in said region.

Advantageously, the deep-learning algorithm comprises a convolutional neural network.

Preferably, the comparison of the classification of the images of the image set performed by the statistical learning algorithm and of the classification of the images of the image set performed by the deep-learning algorithm comprises:

- comparing the classification performed by the statistical learning algorithm and the classification performed by the deep-learning algorithm for each same image of the set of radiographic images,
- determining the number of images classified into the same class by the statistical learning algorithm and by the deep-learning algorithm, and
- determining the classification accuracy of the deep-learning algorithm by computing the ratio between the number of images classified into the same class by the two algorithms and the total number of images in the set of radiographic images.

Another subject of the invention is a system for training a deep-learning algorithm for detecting a defect in a ceramic rolling element, comprising:

- means for capturing a set of digital radiographic images of rolling elements comprising defects and not comprising any defects,
- filtering means configured to improve the contrast of each image of the set of images,
- means for generating a data set on the basis of the set of filtered radiographic images,
- implementing means configured to implement a statistical learning algorithm configured to classify, on the basis of the data set, each image of the image set into a class of suspect rolling elements or into a class of non-suspect rolling elements,
- training means configured to train, on the basis of the set of radiographic images, a deep-learning algorithm so that the deep-learning algorithm classifies each image of the set of radiographic images into the class of suspect rolling elements or into the class of non-suspect rolling elements, and
- comparing means configured to compare the classification of the images of the image set performed by the statistical learning algorithm and the classification of the images of the image set performed by the deep-learning algorithm with a view to determining the accuracy of the classification of the deep-learning algorithm with respect to the classification performed by the statistical learning algorithm.

BRIEF DESCRIPTION OF THE FIGURES

Other aims, features and advantages of the invention will become apparent on reading the following description, which is given purely by way of non-limiting example, and with reference to the appended drawings, in which.

DETAILED DESCRIPTION OF THE INVENTION

Figure 1:
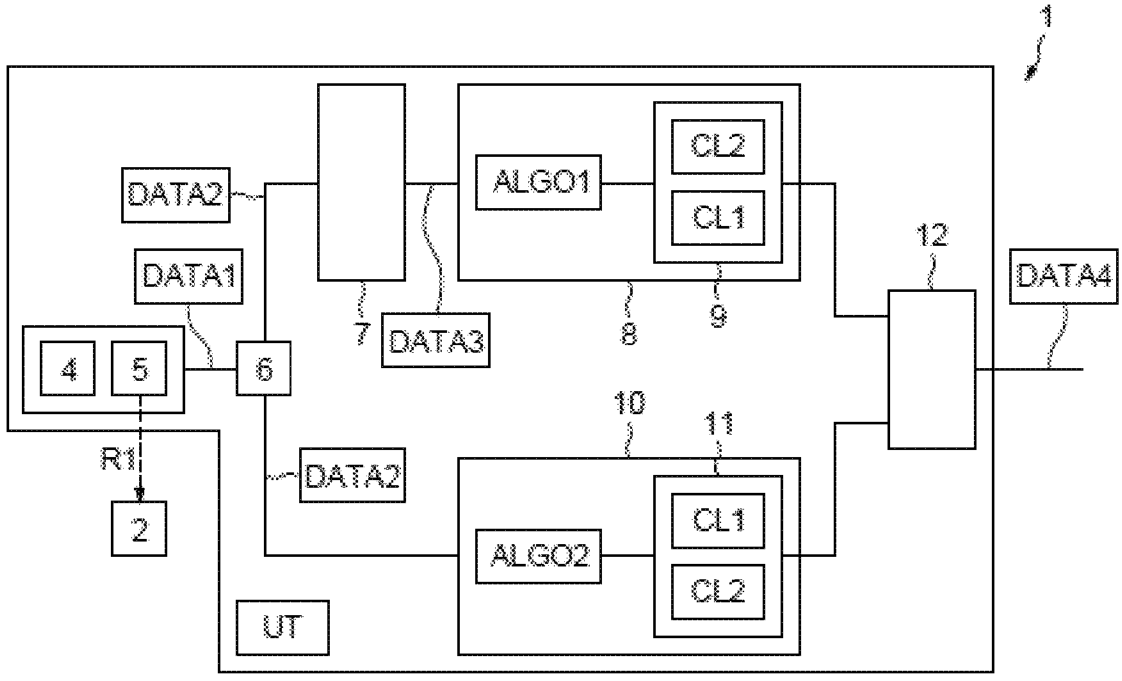
FIG. 1 illustrates a system for training a deep-learning algorithm for detecting a defect in a ceramic rolling element, according to one embodiment of the invention.

FIG. 1 shows a system for training a deep-learning algorithm ALG1 for detecting a defect in a ceramic rolling element 2.

The system 1 comprises means 3 for capturing a set of two-dimensional digital radiographic images DATA1 of rolling elements 2 comprising defects and not comprising any defects, The capturing means 3 comprise a photographic sensor 4 and a generator 5 of high-frequency electromagnetic waves R1 configured to emit the electromagnetic waves R1 towards the element 2.

These electromagnetic waves R1 are subsequently absorbed by the photographic sensor 4.

A two-dimensional digital radiographic image of the rolling element 2 is thus formed.

It will be noted that the generator 4 generally takes the form of a microfocus x-ray tube.

According to another embodiment, the capturing means 3 generate a three-dimensional digital radiographic image.

The system 1 further comprises filtering means 6 that are connected to the capturing means 3 and that process the images of the set of images to improve the contrast of each image of the set of images DATA1 captured by the capturing means 3. The filtering means 6 deliver a set of filtered radiographic images DATA2.

The system 1 also comprises means 7 for generating a data set DATA3 from the set of radiographic images DATA2 filtered by the filtering means 6, and implementing means 8 that implement a statistical learning algorithm ALGO1 that is configured to classify, on the basis of the data set DATA3, each image of the set of filtered images DATA2 into a class CL1 of suspect rolling elements 2 or into a class CL2 of non-suspect rolling elements 2. The generating means 7 are connected to the filtering means 6 and to the implementing means 8.

The classification performed by the statistical learning algorithm ALGO1 is for example stored in a memory 9.

The statistical learning algorithm ALGO1 for example comprises a decision-tree algorithm, a random-forest algorithm, a support-vector-machine algorithm, a K-nearest-neighbours algorithm, or a logistic-regression algorithm.

It will be noted that a suspect rolling element is a rolling element 2 the probability of having at least one defect of which is higher than its probability of not having any defects.

Defects for example comprise inclusions of foreign material, non-uniform agglomerations of material or porosities.

The system 1 further comprises training means 10 that train, on the basis of the set of filtered radiographic images DATA2, a deep-learning algorithm ALGO2 so that the deep-learning algorithm classifies each image of the set of filtered radiographic images DATA2 into the class CL1 of suspect rolling elements or into the class CL2 of non-suspect rolling elements. The training means 10 are connected to the filtering means 6.

The deep-learning algorithm ALGO2 for example comprises a convolutional neural network.

The classification performed by the deep-learning algorithm ALGO2 is for example stored in a memory 11.

The system 1 further comprises comparing means 12 that compare the classification performed by the statistical learning algorithm ALGO1, and the classification performed by the deep-learning algorithm ALGO2 in order to determine the accuracy of the deep-learning algorithm on the basis of the classification of the statistical learning algorithm. The comparing means 12 are connected to the implementing means 8 and to the training means 10, and for example read the content of the memory 9 of the implementing means storing the classification performed by the statistical learning algorithm ALGO1 and the content of the memory 11 of the training means 10 storing the classification performed by the deep-learning algorithm ALGO2.

The system 1 further comprises a processing unit UT that employs the capturing means 3 to capture the set of images DATA1, the filtering means, means 7 for generating a data set DATA3 on the basis of the set of filtered radiographic images DATA2, the implementing means 8, the training means 10, and the comparing means 12.

The comparing means 12 deliver a data set DATA4 indicative of the classification accuracy of the deep-learning algorithm with respect to the classification performed by the statistical learning algorithm.

Analysis of the data set DATA4 allows the operation of the deep-learning algorithm ALGO2 to be validated.

If the accuracy level is insufficient, new data sets DATA1 are generated with a view to continuing the training of the deep-learning algorithm ALGO2.

As a variant, when a set of images DATA1 of sufficient size is available, the system 1 is implemented on the basis of said set with a view to continuing the training of the deep-learning algorithm ALGO2 and improving the accuracy of said algorithm.

Figure 2:
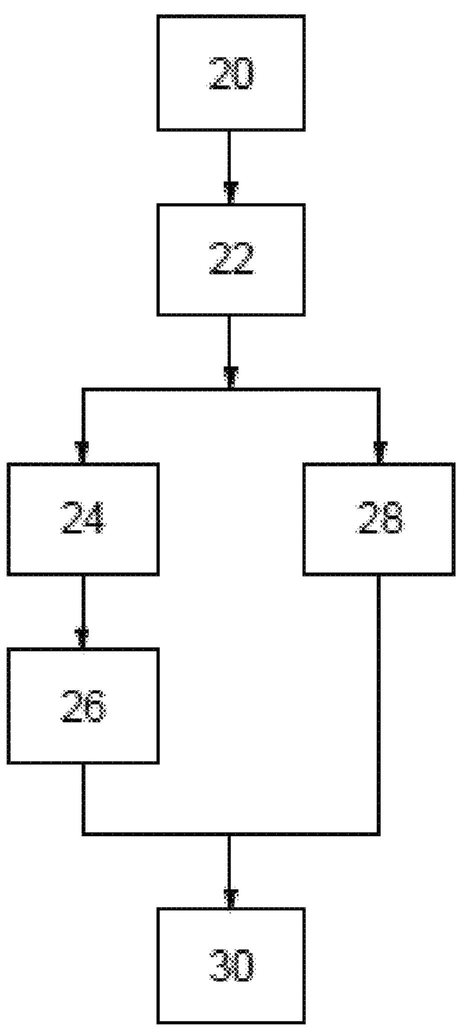
FIG. 2 shows one mode of implementation of the training system according to the invention.

FIG. 2 illustrates one example of implementation of the system 1.

In a step 20, the capturing means 3 capture the set of two-dimensional digital radiographic images DATA1 of rolling elements 2 comprising defects and not comprising any defects.

The set of images DATA1 for example comprises 100 images, allowing a sufficient classification accuracy to be obtained from the algorithm ALGO1.

When the set of the images DATA1 is complete, in a step 22, the filtering means 6 filter the images of the set of images DATA1, so as to improve the contrast of each image, and deliver the set of filtered images DATA2 to the generating means 7 and to the training means 10.

On receipt of the set of filtered images DATA2, the generating means 7 generate the data set DATA3 on the basis of the set of filtered images DATA2 (step 24), then the implementing means 8 implement the statistical learning algorithm ALGO1 so that the statistical learning algorithm ALGO1 classifies each image of the set of filtered images DATA2 into the class CL1 of suspect rolling elements or into the class CL2 of non-suspect rolling elements (step 26).

Furthermore, on receipt of the set of filtered images DATA2, the training means 10 train the deep-learning algorithm ALGO2 so that the deep-learning algorithm classifies each image of the set of filtered images DATA2 into the class CL1 of suspect rolling elements or into the class CL2 of non-suspect rolling elements (step 28).

The two steps 24 and 26, and step 28 are for example carried out in parallel.

As a variant, steps 24 and 26, and 28 are carried out sequentially.

In step 24 of generating the data set DATA3, the generating means 7 segment each image of the set of filtered images DATA2 into various regions.

Next, for each region of each image of the set of filtered images DATA2, the means 7 generate a data vector containing the coding of each image region of the set of images DATA2.

The data set DATA3 comprises the data vector.

Figure 3:
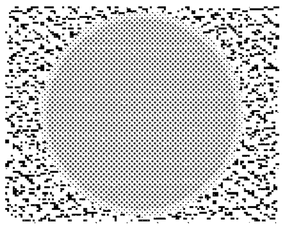
FIG. 3 shows one example of a filtered image according to the invention.

FIG. 3 illustrates an image, filtered by the filtering means 6, of a rolling element 2.

Figure 4:
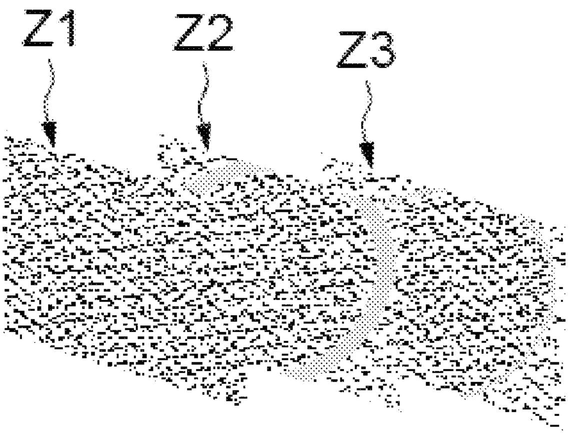
FIG. 4 shows one example of division of a filtered image.

FIG. 4 illustrates division of the filtered image shown in FIG. 3 into three different regions Z1, Z2, Z3, each region being characterized by a different greyscale level.

Each image is filtered by greyscale level.

Of course, each image may be divided into more than at least three different regions.

Figure 5:
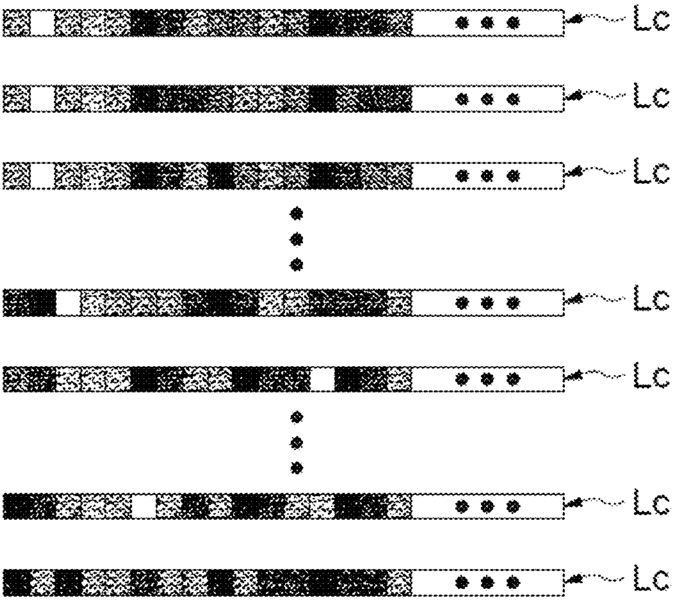
FIG. 5 shows one example of a data set according to the invention.

FIG. 5 illustrates one example of a data set DATA3 modelled by coding lines Lc.

Each line Lc represents data coding an image of the set of filtered images DATA2.

When the implementing means 8 receive the data set DATA3, in step 26, the algorithm ALGO1 implemented by the implementing means 8 computes a value of an image-analysis indicator on the basis of the data set DATA3 for each image of the set of images DATA2.

The image-analysis indicator for example comprises computing an average, and/or a standard deviation, and/or a median, and/or a greyscale gradient.

Next, the value of the image indicator is compared to a threshold.

If the value of the indicator of an image of the set of images DATA2 is higher than the threshold, said image is for example classified into the class of suspect rolling elements CL1, and if the value of the indicator of an image is lower than the threshold, said image is for example classified into the class of non-suspect rolling elements CL2.

In step 28, the training means 10 segment each image of the set of filtered images DATA2 into a plurality of regions, each region corresponding to one selection criterion for example comprising the geometry of the rolling element 2 in said region, and/or the texture in said region and/or the contrast in said region.

Next, the algorithm ALGO2 implemented by the training means 10 processes each region of each image to detect at least one defect on the basis of the selection criterion, detects any defects in the rolling element 2 and classifies said rolling element into one of the classes CL1 and CL2 depending on whether the rolling element 2 is considered to be suspect or not.

For example, if the geometry of the element 2 is not circular to within a predefined tolerance in the region relative to the geometry of the element 2, the algorithm ALGO2 classifies said rolling element 2 into the class CL2.

When all the images of the set of filtered images DATA2 have been classified into one of the classes CL1 and CL2 by the algorithms ALGO1 and ALGO2, in step 30, the comparing means 12 compare the classification performed by the statistical learning algorithm ALGO1, which classification is stored in the memory 9 of the means 8, and the classification performed by the deep-learning algorithm ALGO2, which classification is stored in the memory 11, for each given image of the set of images DATA1.

The comparing means 12 determine the number of images classified into the same class CL1, CL2 by the statistical learning algorithm ALGO1 and by the deep-learning algorithm ALGO2, and determine the classification accuracy of the deep-learning algorithm ALGO2 by computing the ratio between the number of images classified into the same class by both algorithms ALGO1, ALGO2 and the total number of images of the set of radiographic images DATA1.

Next, the comparing means 12 deliver the data set DATA4.

The analysis of the data DATA4 of the classification performed by the statistical learning algorithm ALGO1, which classification is stored in the memory 9, makes it possible to interpret the variation in the weights of the deep-learning algorithm ALGO2 when it comprises a neural network.

When the precision of the deep-learning algorithm ALGO2 is sufficient, the procedure for recognition of defects in the rolling element may be automated so as to increase the production rate of a line for producing rolling elements while minimizing the risks of error in the interpretation of the image set DATA1.

The invention claimed is:

1. A method for training a deep-learning algorithm to detect a defect in a ceramic rolling element, comprising:

capturing a first data set of digital radiographic images of rolling elements having defects and of rolling elements not having defects, performing a first filtering of each image of the first data set to improve a contrast of each image, the first-filtered images comprising a second data set, generating a third data set from the second data set, using the third data set to classify each image of the second data set using a statistical learning algorithm into a first class of suspect rolling elements or into a first class of non-suspect rolling elements, using the first data set to train a deep-learning algorithm to classify each image of the first data set into a second class of suspect rolling elements or into a second class of non-suspect rolling elements, comparing the first class of suspect rolling elements to the second class of suspect rolling elements and/or the first class of non-suspect rolling elements to the second class of non-suspect rolling elements, and determining from the comparing an accuracy of the classification performed by the deep-learning algorithm relative to the classification performed by the statistical learning algorithm.

2. The method according to claim 1, wherein generating the third data set comprises:

segmenting each image of the first data set into a plurality of regions, and performing a second filtering of each of the regions of each image of the second data set to obtain a data vector, the data vectors forming the third data set.

3. The method according to claim 2, wherein using the third data set comprises:

computing a value of an image-analysis indicator on the basis of the third data set, comparing the analysis indicator to a threshold, and classifying each image of the second data set depending on a result of the comparison.

4. A method according to claim 3, wherein computing a value of the image-analysis indicator comprises computing an average, and/or a standard deviation, and/or a median, and/or a greyscale gradient.

5. The method according to claim 1, wherein using the first data set to train the deep-learning algorithm comprises:

segmenting each image of the second data set into a plurality of regions, processing each region of each image of the second data set using the deep-learning algorithm to detect at least one defect based on a selection criterion specific to each region, detecting the at least one defect based on the selection criterion specific to each region, and classifying each image of the second data set.

6. The method according to claim 5, wherein the selection criterion comprises a geometry of the rolling element in the respective each region, and/or a texture in the respective each region and/or a contrast in the respective each region.

7. The method according to claim 1, wherein the deep-learning algorithm comprises a convolutional neural network.

8. The method according to claim 1, wherein comparing the first class of suspect rolling elements to the first class of non-suspect rolling elements and/or comparing the second class of suspect rolling elements to the second class of non-suspect rolling elements comprises determining a first number of the images of the second data set classified into both the first class of suspect rolling elements and into the second class of suspect rolling elements and/or determining a second number of the images of the second data set classified into both the first class of non-suspect rolling elements and into the second class of non-suspect rolling elements, and wherein determining an accuracy comprises determining a ratio of the first number of images to a total number of images in the first class of suspect rolling elements and/or a ratio of the second number of images to a total number of images in the first class of non-suspect rolling elements.

9. A system for training a deep-learning algorithm to detect a defect in a ceramic rolling element, comprising:

means for capturing a first data set of digital radiographic images of rolling elements having defects and of rolling elements not having defects, means for performing a first filtering of each image of the first data set to improve a contrast of each image, the first-filtered images comprising a second data set, means for generating a third data set from the second data set, means for using the third data set to classify each image of the first data set using a statistical learning algorithm into a first class of suspect rolling elements or into a first class of non-suspect rolling elements, means for using the first data set to train a deep-learning algorithm to classify each image of the first data set into a second class of suspect rolling elements or into a second class of non-suspect rolling elements, means for comparing the first class of suspect rolling elements, the first class of non-suspect rolling elements, the second class of suspect rolling elements and the second class of non-suspect rolling elements, and means for determining an accuracy of the classification performed by the deep-learning algorithm relative to the classification performed by the statistical learning algorithm.

* * * * *